United States Patent
Lin et al.

(10) Patent No.: US 11,218,674 B2
(45) Date of Patent: Jan. 4, 2022

(54) PROJECTION DEVICE AND BRIGHTNESS ADJUSTING METHOD THEREOF

(71) Applicant: Coretronic Corporation, Hsin-Chu (TW)

(72) Inventors: Chi-Wei Lin, Hsin-Chu (TW); Chien-Chun Peng, Hsin-Chu (TW); Hsun-Cheng Tu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/987,414

(22) Filed: Aug. 7, 2020

(65) Prior Publication Data
US 2021/0058593 A1    Feb. 25, 2021

(30) Foreign Application Priority Data
Aug. 23, 2019    (CN) .......................... 201910783200.1

(51) Int. Cl.
*H04N 9/31* (2006.01)
*G09G 5/10* (2006.01)

(52) U.S. Cl.
CPC ............ *H04N 9/3182* (2013.01); *G09G 5/10* (2013.01); *H04N 9/312* (2013.01); *G09G 2360/141* (2013.01); *G09G 2360/144* (2013.01)

(58) Field of Classification Search
CPC .... H04N 5/2354; H04N 9/3182; H04N 9/312; H04N 9/3155; H04N 9/3194; G09G 5/10;
(Continued)

(56) References Cited

U.S. PATENT DOCUMENTS

| 10,942,607 | B2* | 3/2021 | Niikura | G06F 3/0416 |
| 2008/0259289 | A1* | 10/2008 | Nozaki | G03B 17/00 353/70 |

(Continued)

FOREIGN PATENT DOCUMENTS

| CN | 101046600 | 10/2007 |
| CN | 101789230 | 7/2010 |

(Continued)

OTHER PUBLICATIONS

"Office Action of Taiwan Counterpart Application", dated Nov. 6, 2020, p. 1-p. 10.

(Continued)

*Primary Examiner* — Paulos M Natnael
(74) *Attorney, Agent, or Firm* — JCIPRNET

(57) ABSTRACT

A projection device including a projection unit, an image capture device and a control unit is provided. The projection unit includes a light source. The projection unit is configured to project an image picture to a projection area. The image capture device is configured to obtain an image capture picture including the image picture in an image capture range. The image capture range is larger than the projection area. The control unit is coupled to the image capture device. The control unit is configured to determine, according to a picture variation value of the image capture picture, whether to adjust the brightness of the light source. In addition, a brightness adjusting method used for the projection device is also provided. According to the disclosure, the brightness of the light source of the projection device may be properly adjusted according to environmental factors.

16 Claims, 16 Drawing Sheets

Project an image picture to a projection area — S100

Obtain an image capture picture including the image picture in an image capture range — S110

Determine, according to a picture variation value of the image capture picture, whether to adjust the brightness of a light source — S120

(58) Field of Classification Search
CPC ....... G09G 2360/141; G09G 2360/144; G09G 3/20; G09G 2320/0626; G09G 2320/0666; G09G 2360/16; G09G 5/02; G03B 21/2053
See application file for complete search history.

(56) References Cited

U.S. PATENT DOCUMENTS

| | | | |
|---|---|---|---|
| 2009/0086314 A1* | 4/2009 | Namba | G02B 21/34 |
| | | | 359/383 |
| 2013/0201457 A1 | 8/2013 | Watanabe et al. | |
| 2016/0373628 A1* | 12/2016 | Nakajima | H04N 5/58 |
| 2018/0187484 A1* | 7/2018 | Hebeisen | F24F 11/30 |

FOREIGN PATENT DOCUMENTS

| | | |
|---|---|---|
| CN | 106502031 | 3/2017 |
| CN | 208863001 | 5/2019 |
| TW | 200712733 | 4/2007 |
| TW | I429289 | 3/2014 |
| TW | 201737701 | 10/2017 |
| TW | 201916677 | 4/2019 |
| TW | 201921083 | 6/2019 |

OTHER PUBLICATIONS

"Office Action of China Counterpart Application", dated Oct. 11, 2021, p. 1-p. 6.

* cited by examiner

PROJECTION DEVICE AND BRIGHTNESS ADJUSTING METHOD THEREOF

CROSS-REFERENCE TO RELATED APPLICATION

This application claims the priority benefit of China application serial no. 201910783200.1, filed on Aug. 23, 2019. The entirety of the above-mentioned patent application is hereby incorporated by reference herein and made a part of this specification.

BACKGROUND OF THE DISCLOSURE

Field of the Disclosure

The disclosure relates to an optical device and a parameter adjusting method thereof, and in particular, to a projection device and a brightness adjusting method thereof.

Description of Related Art

Existing projection devices adjust brightness of a projection image by utilizing ambient light sensing feedback, and for such a mechanism, a photosensitive element needs to be additionally disposed on the projection device. The projection device detects intensity of ambient light according to the photosensitive element to adjust brightness of a light source in the projection device, so as to avoid discomfort of human eyes caused by excessive projection brightness in a relatively dark environment, and meanwhile reduce the brightness to achieve the effect of energy saving. Generally, the photosensitive element built in the projection device is disposed on a back side opposite to the projection picture. When lamps in a meeting room are turned on, the photosensitive element senses that the brightness of ambient light is increased. The projection device increases the brightness of the light source according to the ambient light sensing feedback, so as to meet the requirement of users. When the lamps in the meeting room are turned off, the photosensitive element senses that the brightness of the ambient light is reduced, and the projection device reduces the brightness of the light source according to the ambient light sensing feedback, so as to protect the human eyes. However, if only a front row of the lamps in the meeting room are turned off, because the disposition position of the photosensitive element is on the back side of the projection device, the photosensitive element cannot sense the accurate ambient light at a position where the users are located, and therefore, the brightness of the light source of the projection device cannot be changed, causing discomfort of the eyes of the users, and as for the users closer to the projection image, intensive discomfort of the eyes will be caused. Moreover, for such a manner in which the photosensitive element is additionally installed on the projection device, the installation position on the projection device is very important. If the photosensitive element is installed on an upper cover of the projection device, and the projection device is hung on a ceiling, such a disposing manner causes the photosensitive element to face and get close to the ceiling, then the photosensitive element cannot sense the real ambient brightness, misjudgment is easily caused. As a result, the brightness adjustment effect is poor.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure are acknowledged by a person of ordinary skill in the art.

SUMMARY OF THE DISCLOSURE

The disclosure provides a projection device and a brightness adjusting method thereof, which may cause brightness of a light source of the projection device to be properly adjusted according to environmental factors.

Other objectives and advantages of the disclosure may be more comprehensible from technical features disclosed in the disclosure.

In order to achieve one or some of or all the foregoing objectives or other objectives, an embodiment of the disclosure provides a projection device, including a projection unit, an image capture device and a control unit. The projection unit includes a light source. The projection unit is configured to project an image picture to a projection area. The image capture device is configured to obtain an image capture picture including the image picture in an image capture range. The image capture range is larger than the projection area. The control unit is coupled to the image capture device. The control unit is configured to determine, according to a picture variation value of the image capture picture, whether to adjust brightness of the light source.

In order to achieve one or some of or all the foregoing objectives or other objectives, an embodiment of the disclosure provides a brightness adjusting method used for the projection device. The projection device includes a light source. The brightness adjusting method includes: projecting an image picture to a projection area; obtaining an image capture picture including the image picture in an image capture range; and determining, according to a picture variation value of the image capture picture, whether to adjust brightness of the light source. The image capture range is larger than the projection area.

Based on the above, embodiments of the disclosure at least have one of the following advantages or effects. The projection device determines an environmental change by utilizing the image capture device to obtain the image capture picture, so that the brightness of the light source of the projection device is properly adjusted according to ambient brightness.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

Embodiments of the disclosure will be illustrated below with the accompanying drawings. The directional terms mentioned in the disclosure, like "above", "below", "front", "back", "left", and "right", refer to the directions in the appended drawings. Therefore, the directional terms are only used for illustration instead of limiting the disclosure.

Figure 1:
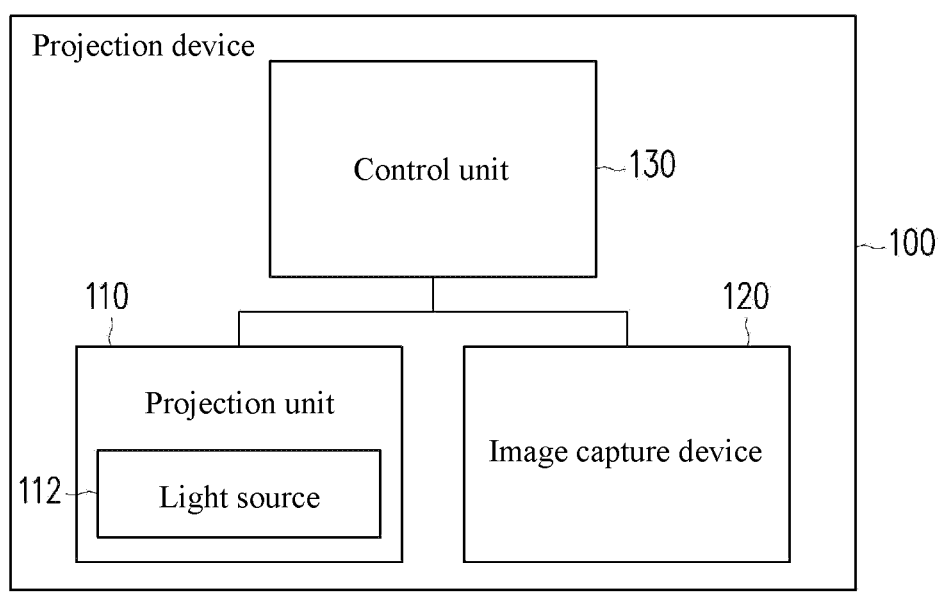
FIG. 1 illustrates a schematic outline diagram of a projection device of an embodiment of the disclosure.
Figure 3:
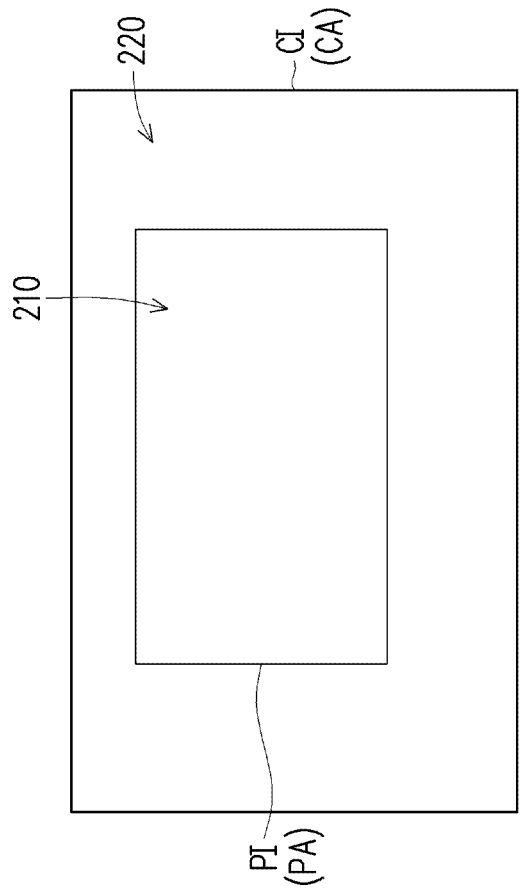
FIG. 3 illustrates a schematic outline diagram of an image capture picture obtained by an image capture device of the embodiment in FIG. 1.
Figure 2:
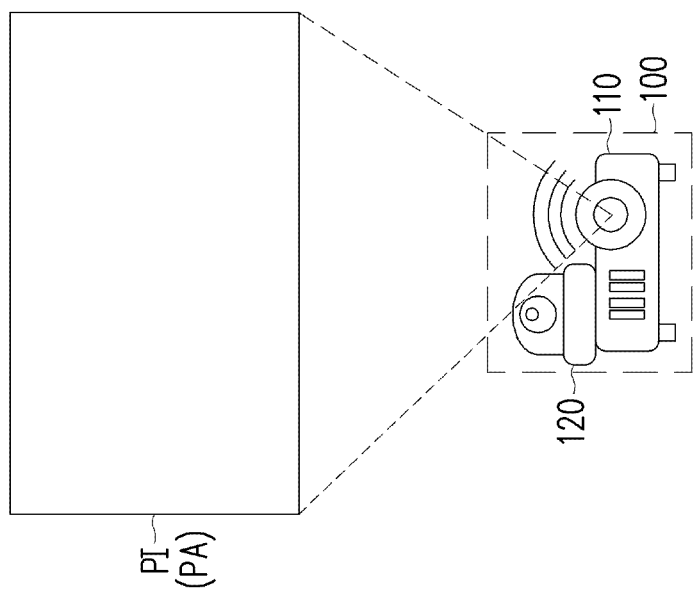
FIG. 2 illustrates a schematic outline diagram in which the projection device of the embodiment in FIG. 1 projects an image picture to a projection area.

FIG. 1 illustrates a schematic outline diagram of a projection device of an embodiment of the disclosure. FIG. 2 illustrates a schematic outline diagram that the projection device of the embodiment of FIG. 1 projects an image picture to a projection area. FIG. 3 illustrates a schematic outline diagram of an image capture picture obtained by an image capture device of the embodiment of FIG. 1. Referring to FIG. 1 to FIG. 3, the projection device 100 of the embodiment includes a projection unit 110, an image capture device 120 and a control unit 130. The control unit 130 is coupled to the image capture device 120. The projection unit 110 includes a light source 112. The light source 112, for example, is a metal halogen lamp, a high voltage mercury lamp, or a solid-state illumination source, for example, a light emitting diode, a laser diode or the like.

The projection unit 110 is configured to project an image picture PI to a projection area PA. The projection device 100, for example, is a projection machine. The projection unit 110, for example, is a combination of elements or mechanisms configured to execute a projection function in the projection machine. For example, the projection unit 110 is a hardware device having a plurality of lenses and a light valve. The light valve may be reflective liquid crystal on silicon (LCOS), a digital micro-mirror device (DMD), or a transmission type spatial light modulator, for example, a transparent liquid crystal panel. For the foregoing implementation mode, enough teachings, suggestions and implementation descriptions may be obtained from general knowledge in the art. The projection area PA, for example, is a flat or curved surface such as a projection screen, a screen or a wall. The image capture device 120, for example, is a camera built in or hung outside the projection machine. The image capture device 120 is configured to obtain the image capture picture CI in an image capture range CA. The image capture picture CI includes the image picture PI. In the embodiment, the image capture range CA is larger than the projection area PA, so that the image capture device 120 may obtain the image capture picture CI including the image picture PI.

The control unit 130 is configured to determine, according to a picture variation value of the image capture picture CI, whether to adjust the brightness of the light source 112. The picture variation value, for example, is a brightness variation value, a gray scale variation value or a color variation value. In the embodiment, the image capture picture CI includes a first area 210 and a second area 220. The first area 210 corresponds to the projection area PA, and the second area 220 corresponds to a non-projection area. The non-projection area, for example, is an area excluding the image picture PI in the image capture picture CI. The control unit 130 determines, according to the picture variation value of the second area 220, whether to adjust the brightness of the light source 112. The picture variation value of the second area 220 includes information of ambient brightness variation. In an embodiment, the control unit 130 may also determine, according to the picture variation value of the whole (including the first area 210 and the second area 220) of the image capture picture CI, whether to adjust the brightness of the light source 112.

In an embodiment, the image capture device 120 may also capture the image capture picture CI only including the first area 210. Therefore, the control unit 130 may also determine, only according to the picture variation value of the first area 210, whether to adjust the brightness of the light source 112. For example, if the image picture PI projected by the projection unit 100 is kept unchanged, or the control unit 130 may determine that the image picture PI is kept unchanged during image capture, the image capture range CA of the image capture device 120 does not have to include the second area 220 corresponding to the non-projection area, and whether to adjust the brightness of the light source 112 may be determined only according to the first area 210 corresponding to the projection area.

Figure 4:
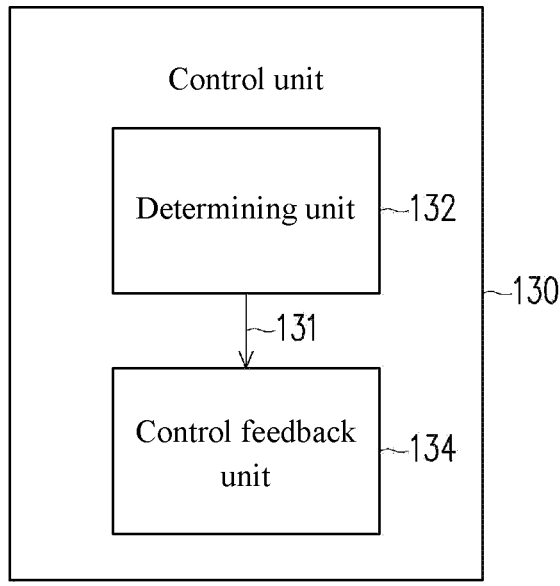
FIG. 4 illustrates a schematic outline diagram of a control unit of the embodiment in FIG. 1.

Specifically, FIG. 4 illustrates a schematic outline diagram of the control unit of the embodiment of FIG. 1. Referring to FIG. 1 to FIG. 4, the control unit 130 includes a determining unit 132 and a control feedback unit 134. The determining unit 132 is coupled to the image capture device 120. The control feedback unit 134 is coupled to the determining unit 132. The determining unit 132 is configured to determine a numerical value relationship between the picture variation value and a preset value range according to the second area 220 and output a determining result 131. The control feedback unit 134 is configured to receive the determining result 131, and determine, according to the determining result 131, whether to adjust the brightness of the light source 112.

In the embodiment, the control unit 130, for example, is a processor chip or field-programmable gate arrays (FPGA) chip in the projection machine, and for the implementation mode thereof, enough teachings, suggestions and implementation descriptions may be obtained from general knowledge in the art. The determining unit 132 and the control feedback unit 134 may be processor chips or programmable controllers, application specific integrated circuits (ASIC), programmable logic devices (PLD) or other similar devices or combination of these devices, or different circuit blocks having the same function.

Figure 5:
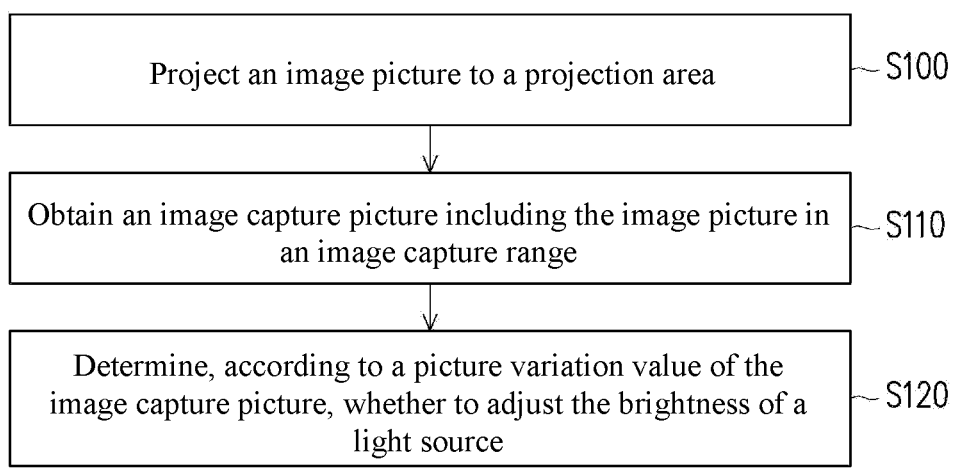
FIG. 5 illustrates a step flowchart of a brightness adjusting method of an embodiment of the disclosure.

FIG. 5 illustrates a step flow diagram of a brightness adjusting method of an embodiment of the disclosure. Referring to FIG. 1 to FIG. 5, the brightness adjusting method of the embodiment is at least applicable to the projection device 100 of FIG. 1, but is not limited in the disclosure. Taking the projection device of FIG. 1 as an example, in step S100, the projection unit 110 projects the image picture PI to the projection area PA. In step S110, the image capture device 120 obtains the image capture picture CI including the image picture PI in the image capture range CA. In step S120, the control unit 130 determines, according to the picture variation value of the image capture picture CI, whether to adjust the brightness of the light source 112. Moreover, for the brightness adjusting method of the embodiment of the disclosure, enough teachings, suggestions and implementation descriptions may be obtained by narrations of the embodiments of FIG. 1 to FIG. 4, and thus are not repeated.

The implementation modes of the projection device and the brightness adjusting method thereof in different application scenarios are illustrated below.

Figure 6A:
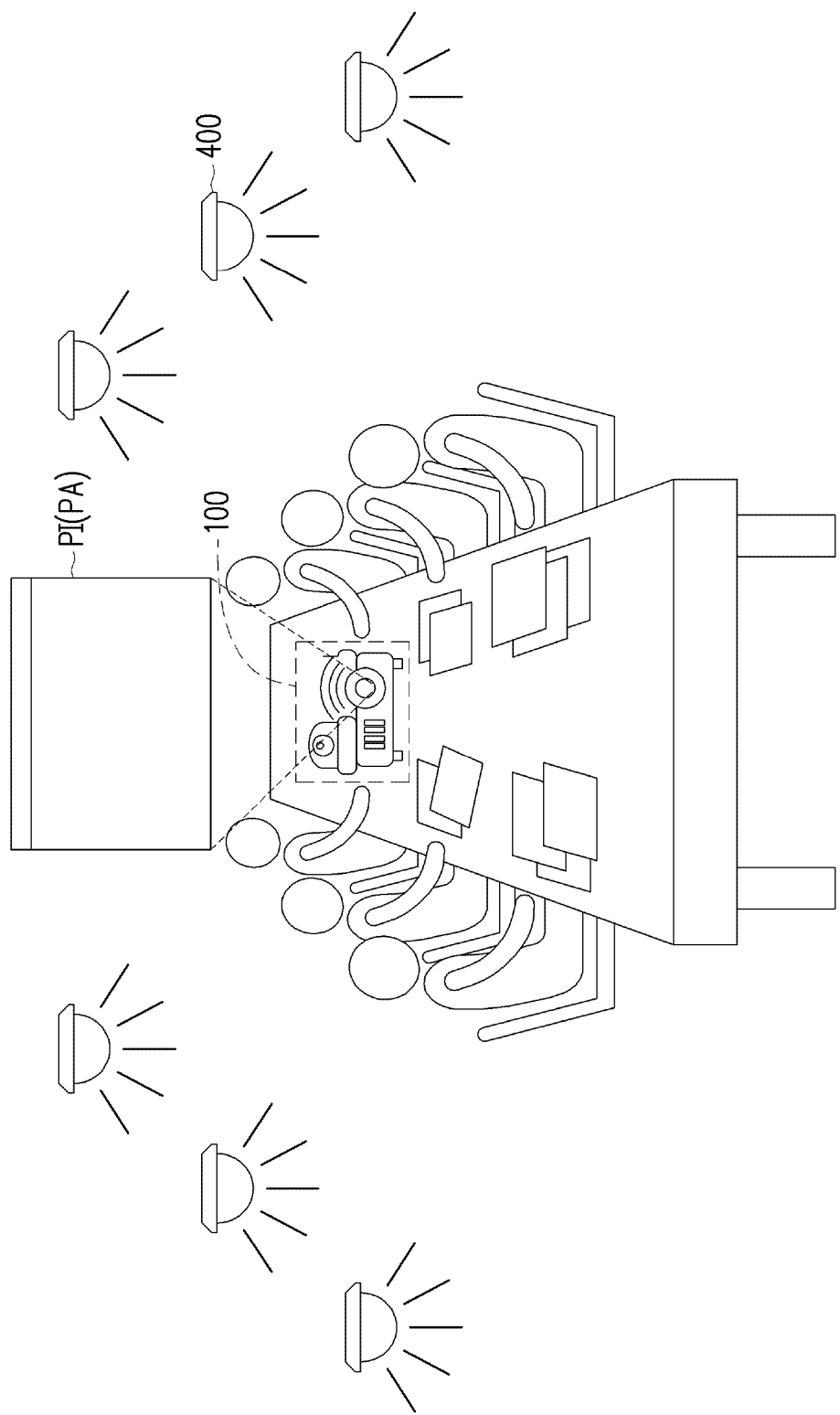
FIG. 6A illustrates a schematic outline diagram of a projection device of an embodiment of the disclosure in a first application scenario.
Figure 6B:
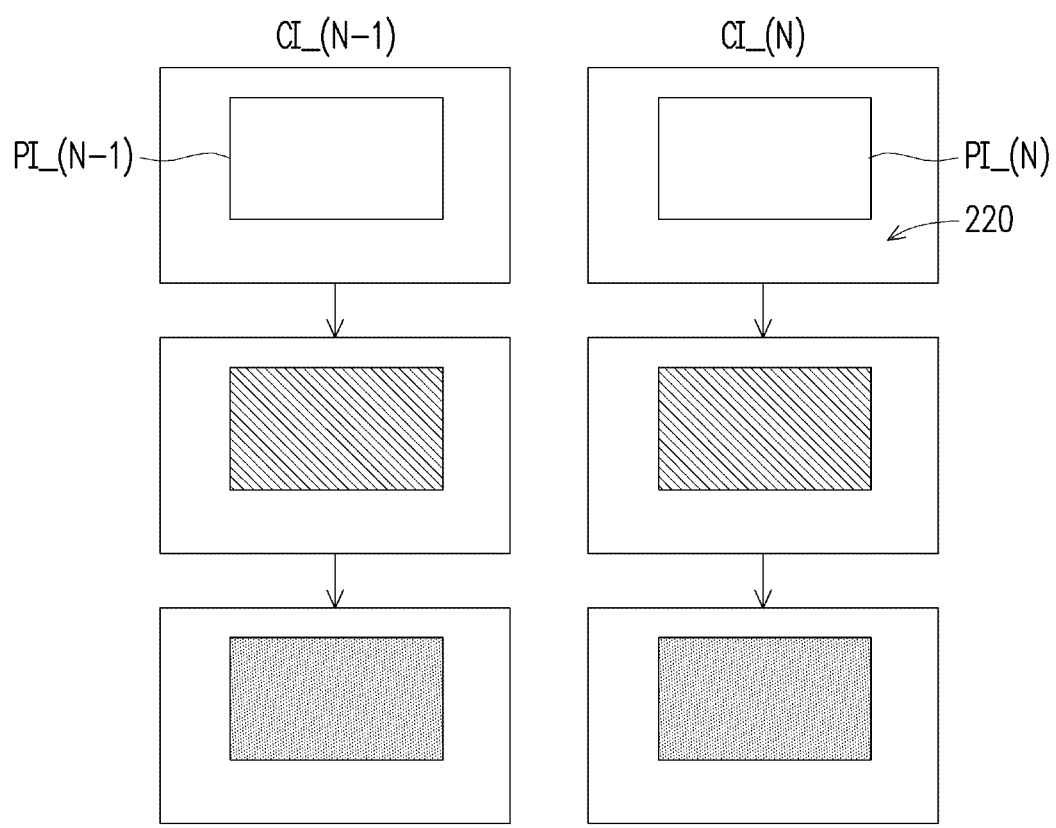
FIG. 6B illustrates a schematic outline diagram of an image capture picture of the embodiment in FIG. 6A.
Figure 6C:
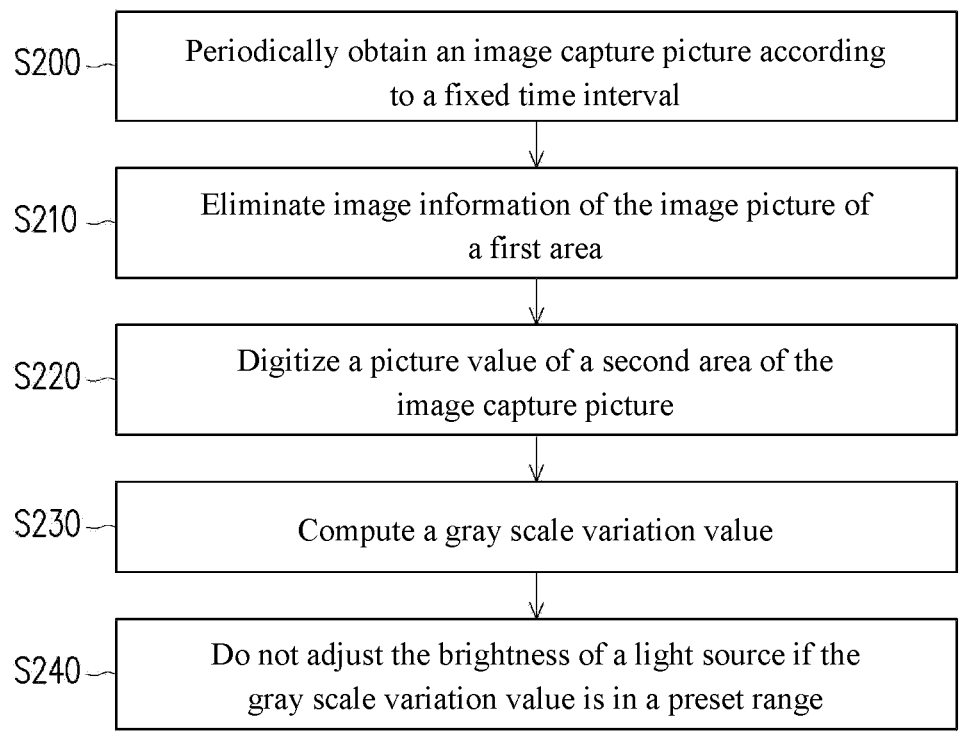
FIG. 6C illustrates a step flowchart of a brightness adjusting method of the embodiment in FIG. 6A.

FIG. 6A illustrates a schematic outline diagram of a projection device of an embodiment of the disclosure in a first application scenario. FIG. 6B illustrates a schematic outline diagram of an image capture picture of the embodiment of FIG. 6A. FIG. 6C illustrates a step flow diagram of a brightness adjusting method of the embodiment of FIG. 6A. Referring to FIG. 6A to FIG. 6C, the projection device 100 of the embodiment, for example, is used in an application scenario without obvious change of the brightness of an ambient light source 400. For example, all lamps in a meeting room are turned on and are kept unchanged.

In the embodiment, image capture pictures CI_(N−1) and CI_(N) of the image capture device 120 at different times are as shown in FIG. 6B. In step S200, the image capture device 120 periodically obtains the image capture pictures CI_(N−1) and, CI_(N) according to a fixed time interval. For example, the image capture device 120 obtains the image capture picture CI_(N−1) first, and obtains the image capture picture CI_(N) after 5 seconds. The image capture pictures CI_(N−1) and CI_(N) respectively include image pictures PI_(N−1) and PI_(N), and the two may be the same or different.

In the embodiment, the control unit 130 determines, according to the picture variation value of the second area 220, whether to adjust the brightness of the light source 112. Therefore, in step S210, the control unit 130 will eliminate the image information of the image pictures PI_(N−1) and PI_(N) after receiving the image capture pictures CI_(N−1) and CI_(N) (as shown in FIG. 6B), so as to perform comparison on the picture value of the second area 220. Then, in step S220, the control unit 130 digitizes the picture values of the second areas 220 of the image capture pictures CI_(N−1) and CI_(N) (as shown in FIG. 6B). Taking a gray-scale value as an example, the control unit 130 may obtain corresponding gray-scale values respectively after digitizing the second areas 220 of the image capture pictures CI_(N−1) and CI_(N). In this example, the gray-scale values of the second areas 220 of the image capture pictures CI_(N−1) and CI_(N) are respectively 200 and 205.

In step S230, the control unit 130 computes a difference (namely, a gray scale variation value) between the two gray-scale values of the second areas 220 of the image capture pictures CI_(N−1) and CI_(N), for example, subtracting the gray-scale value of the second area 220 of the image capture picture CI_(N) from the gray-scale value of the second area 220 of the image capture picture CI_(N−1). In step S240, the control unit 130 determines, according to the gray scale variation value, whether to adjust the brightness of the light source 112. For example, the control unit 130 determines a numerical value relationship between the picture variation value and a preset range. In the embodiment, the gray scale variation value is −5. When the gray scale variation value is in the preset range (for example, being greater than −50 and less than +50), the control unit 130 does not adjust the brightness of the light source. Further, the preset range is greater than −50 and less than +50, for example, a range between a first preset value +50 and a second preset value −50, and the first preset value is greater than the second preset value. That is, in the first application scenario, the control unit 130 determines that the ambient brightness does not obviously change, and therefore does not adjust the brightness of the light source 112. In other embodiments, when the gray scale variation value is not in the preset range, the control unit 130 will adjust the brightness of the light source 112. That is, the control unit 130 determines that the ambient brightness changes, and therefore adjusts the brightness of the light source 112.

Figure 7A:
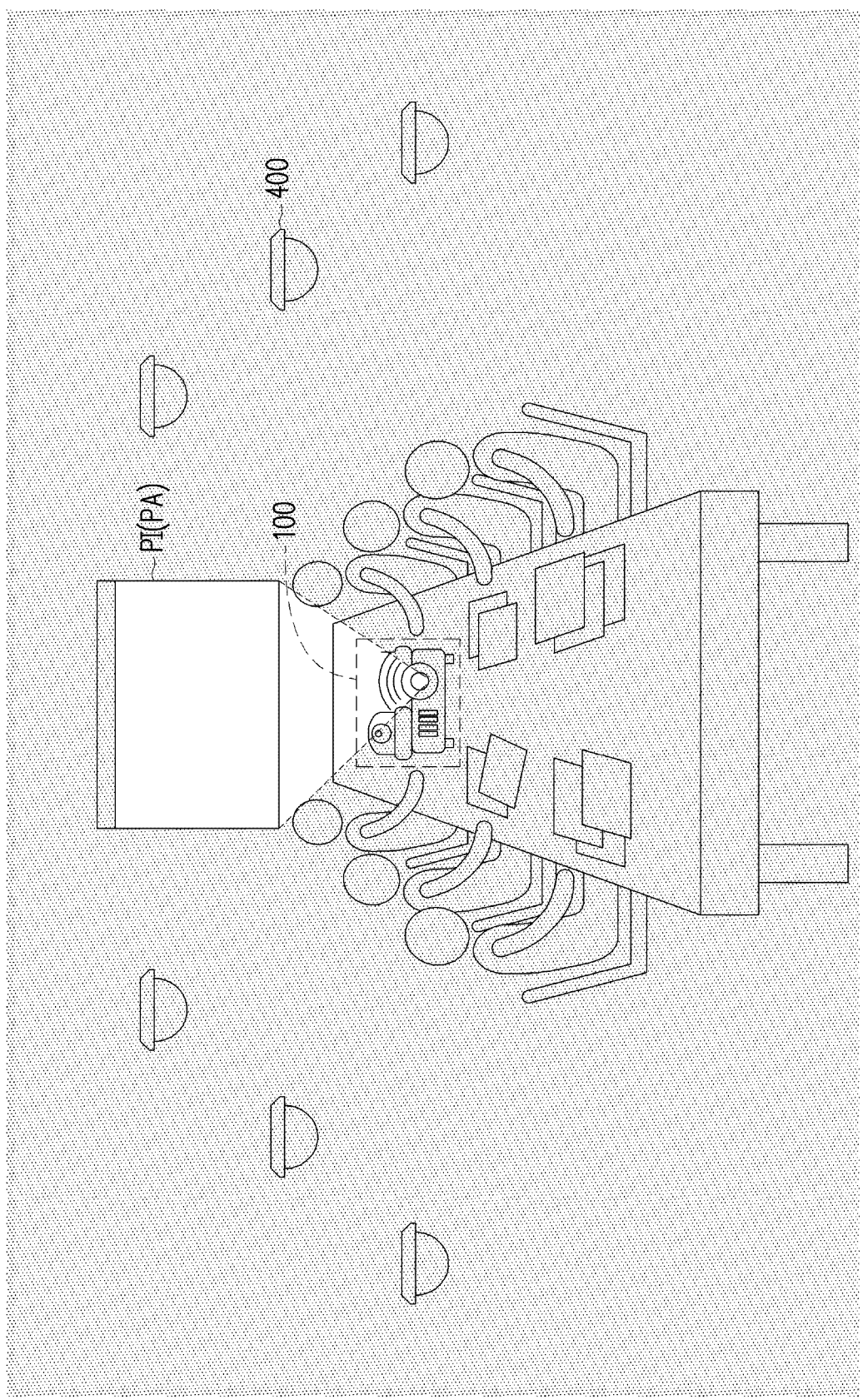
FIG. 7A illustrates a schematic outline diagram of a projection device of an embodiment of the disclosure in a second application scenario.
Figure 7B:
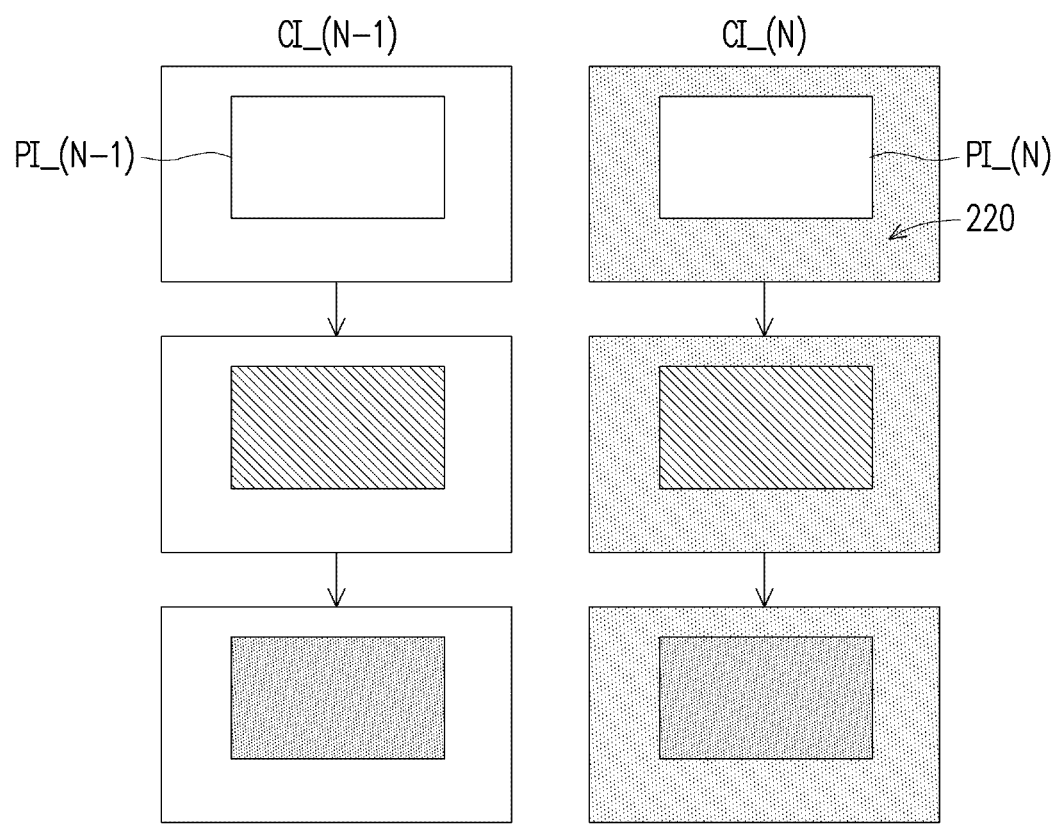
FIG. 7B illustrates a schematic outline diagram of an image capture picture of the embodiment of FIG. 7A.
Figure 7C:
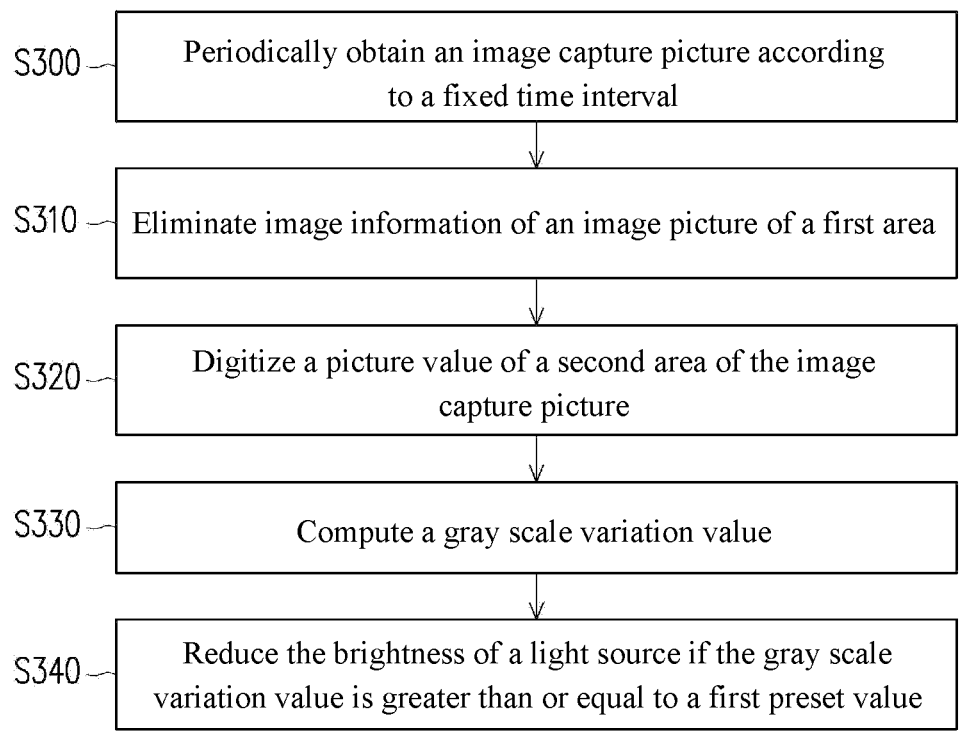
FIG. 7C illustrates a step flowchart of a brightness adjusting method of the embodiment in FIG. 7A.

FIG. 7A illustrates a schematic outline diagram of a projection device of an embodiment of the disclosure in a second application scenario. FIG. 7B illustrates a schematic outline diagram of an image capture picture of the embodiment of FIG. 7A. FIG. 7C illustrates a step flow diagram of a brightness adjusting method of the embodiment of FIG. 7A. Referring to FIG. 7A to FIG. 7C, the projection device 100 of the embodiment, for example, is used in an application scenario with an obvious change of the brightness of an ambient light source 300. For example, all lamps in a meeting room are turned off from the state of being turned on.

The brightness adjusting method of the embodiment is similar to the brightness adjusting method of FIG. 6C, and a main difference between the two, for example, lies in that the gray-scale values of the second areas 220 of the image capture pictures CI_(N−1) and CI_(N) of the embodiment are, for example, respectively 200 and 120. In step S340, the control unit 130 determines a numerical value relationship between a gray scale variation value and a preset value. In the embodiment, the gray scale variation value is +80. When the gray scale variation value is greater than or equal to the first preset value (for example herein, +50), the control unit 130 reduces the brightness of the light source 112. That is, in the second application scenario, the control unit 130 determines that the ambient brightness becomes dark from bright, and therefore reduces the brightness of the light source 112, so as to avoid discomfort of eyes of a user.

Figure 8A:
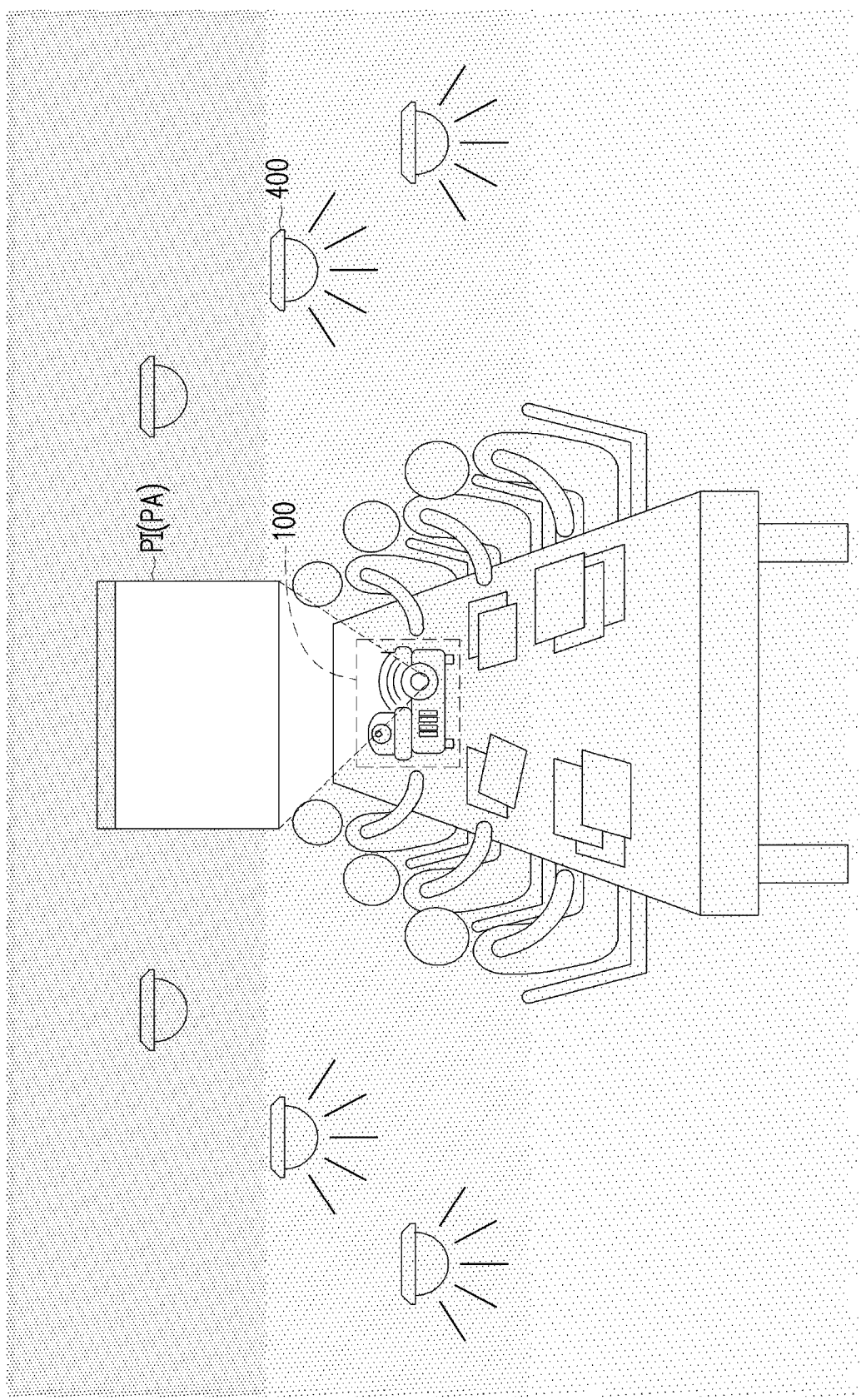
FIG. 8A illustrates a schematic outline diagram of a projection device of an embodiment of the disclosure in a third application scenario.
Figure 8B:
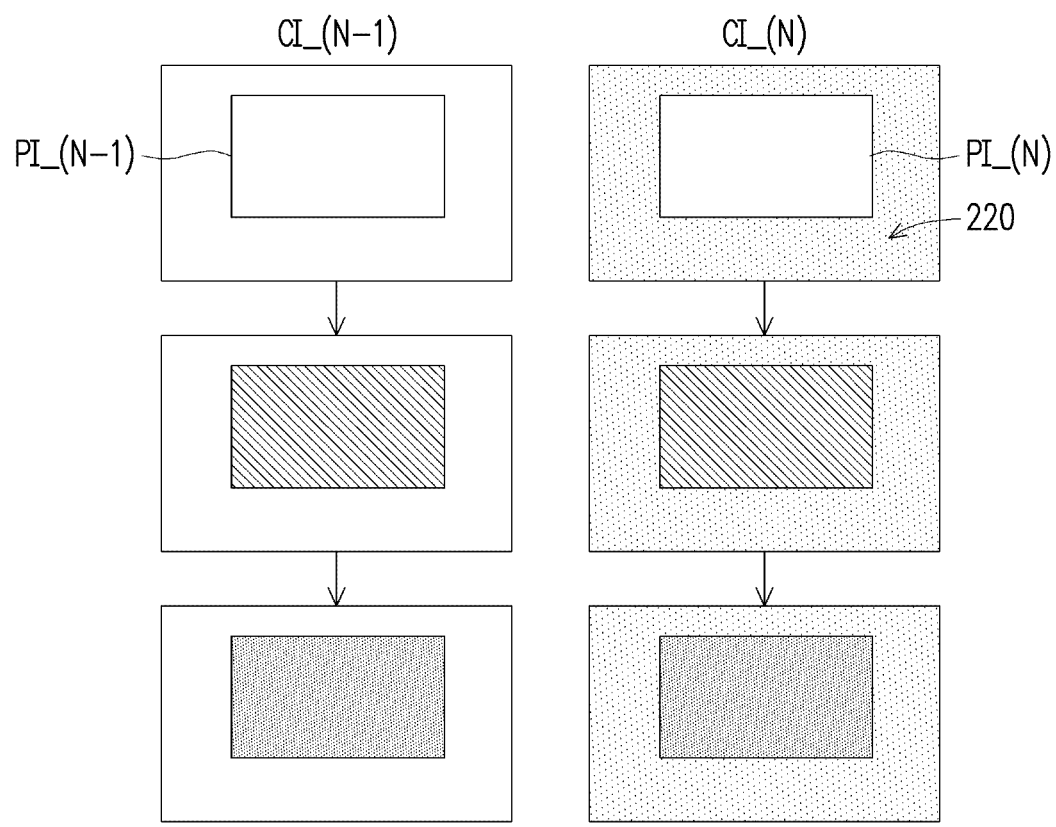
FIG. 8B illustrates a schematic outline diagram of an image capture picture of the embodiment in FIG. 8A.
Figure 8C:
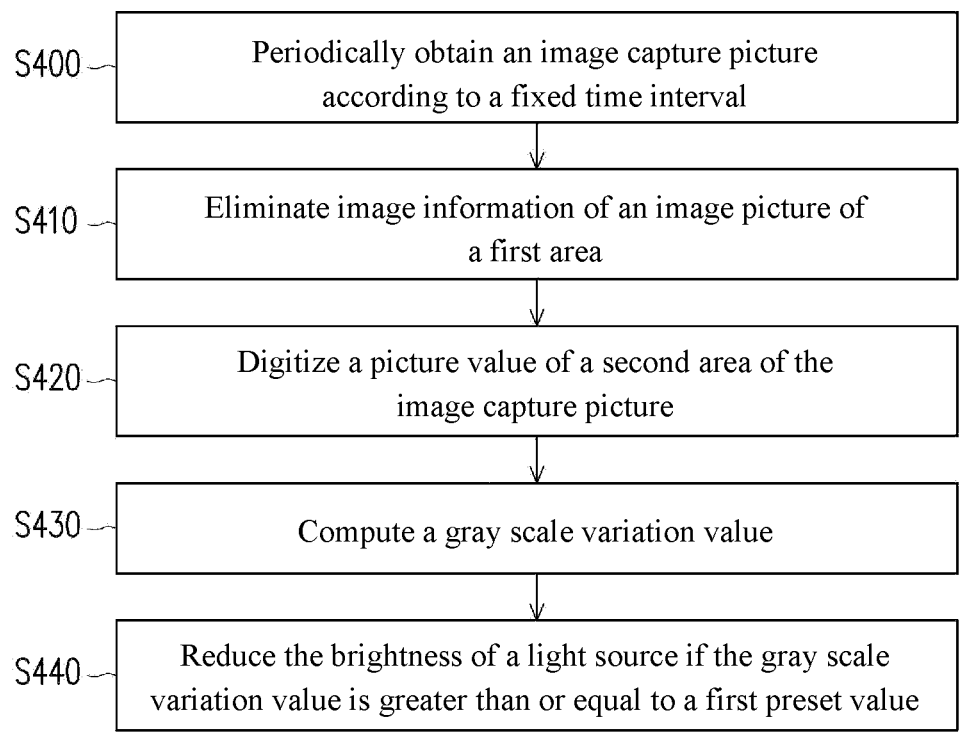
FIG. 8C illustrates a step flowchart of a brightness adjusting method of the embodiment in FIG. 8A.

FIG. 8A illustrates a schematic outline diagram of a projection device of an embodiment of the disclosure in a third application scenario. FIG. 8B illustrates a schematic outline diagram of an image capture picture of the embodiment of FIG. 8A. FIG. 8C illustrates a step flow diagram of a brightness adjusting method of the embodiment of FIG. 8A. Referring to FIG. 8A to FIG. 8C, the projection device 100 of the embodiment, for example, is used in an application scenario with slight change of the brightness of the ambient light source 300, for example, part of lamps in a meeting room are turned off from the state that all the lamps are turned on.

The brightness adjusting method of the embodiment is similar to the brightness adjusting method of FIG. 7C, and a main difference between the two, for example, lies in that the gray-scale values of the second areas 220 of image capture pictures CI_(N−1) and CI_(N) of the embodiment are, for example, respectively 200 and 150. In step S440, the control unit 130 determines a numerical value relationship between a gray scale variation value and a preset value. In the embodiment, the gray scale variation value is +50. When the gray scale variation value is greater than or equal to the first preset value (for example herein, +50), the control unit 130 reduces the brightness of the light source 112. That is, in the third application scenario, the control unit 130 determines that the ambient brightness becomes dark from bright, and therefore reduces the brightness of the light source 112, so as to avoid discomfort of the eyes of the user.

Figure 9A:
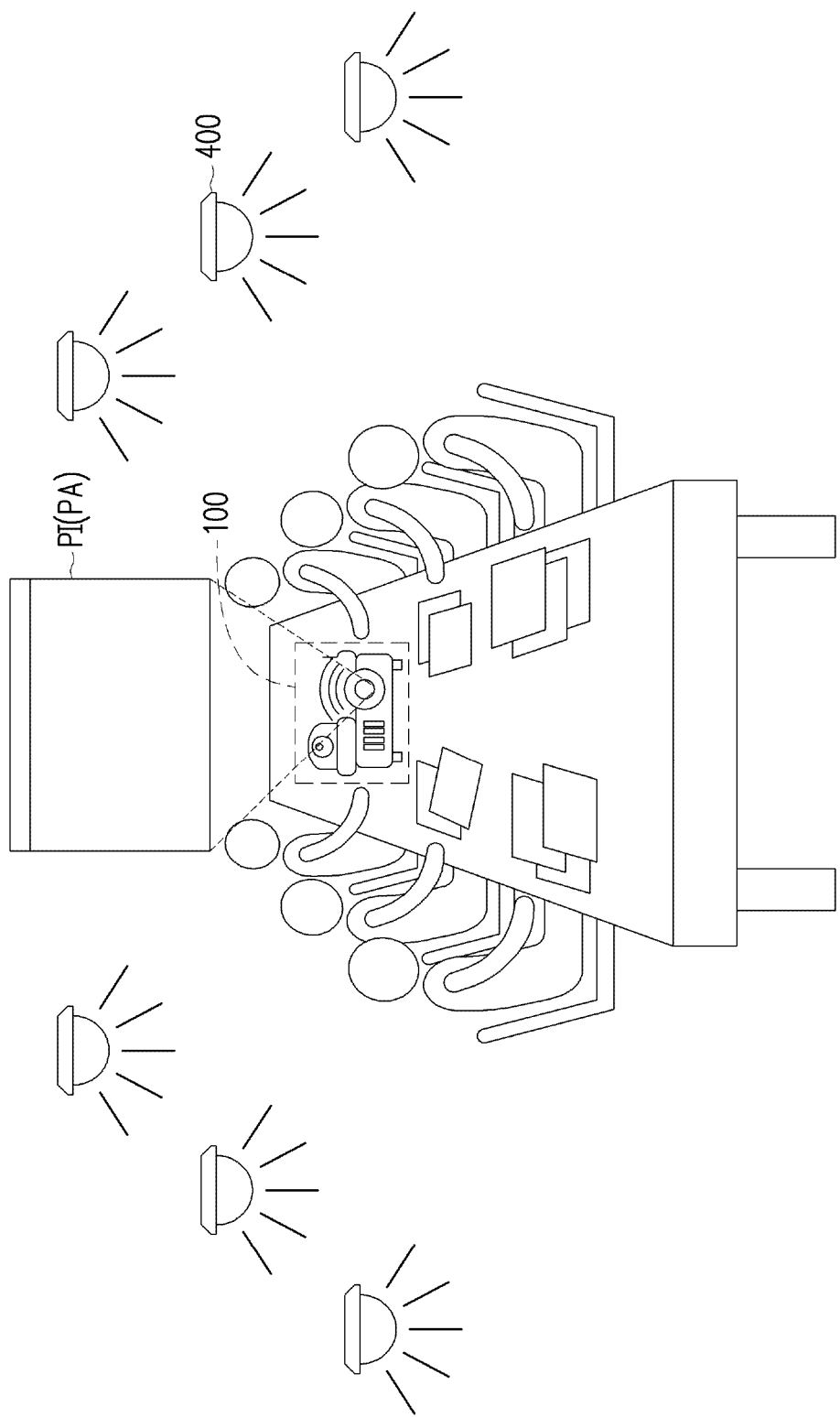
FIG. 9A illustrates a schematic outline diagram of a projection device of an embodiment of the disclosure in a fourth application scenario.
Figure 9B:
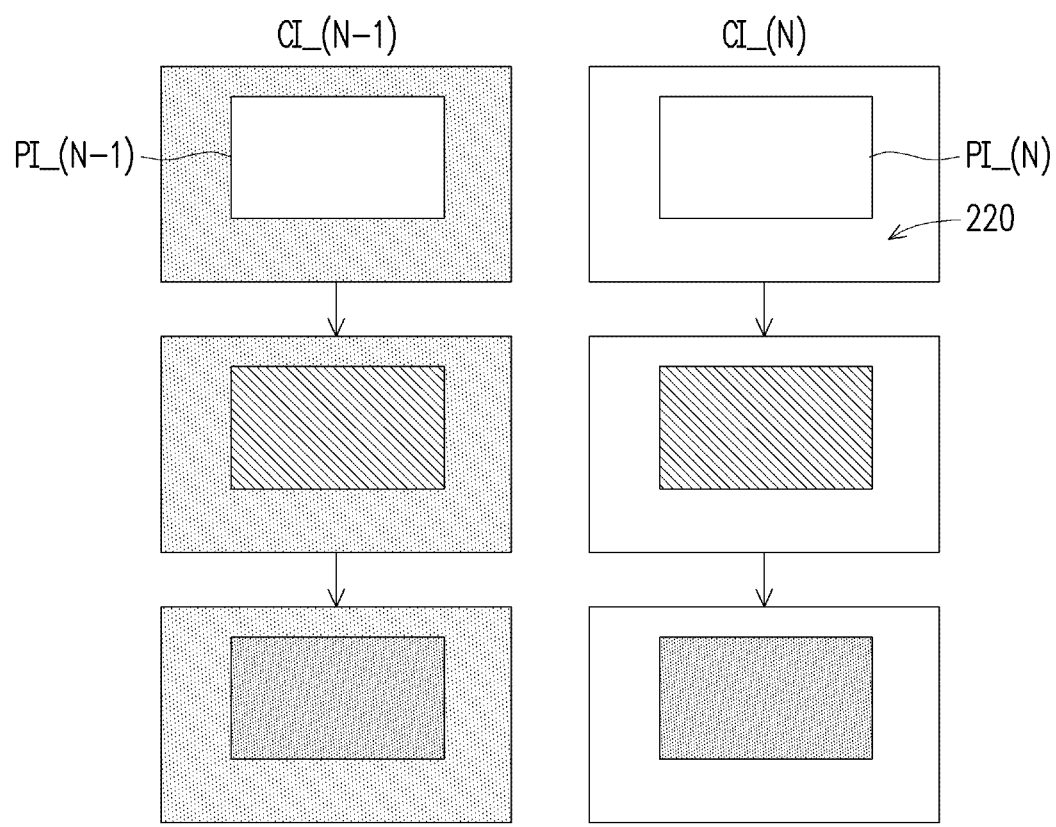
FIG. 9B illustrates a schematic outline diagram of an image capture picture of the embodiment in FIG. 9A.
Figure 9C:
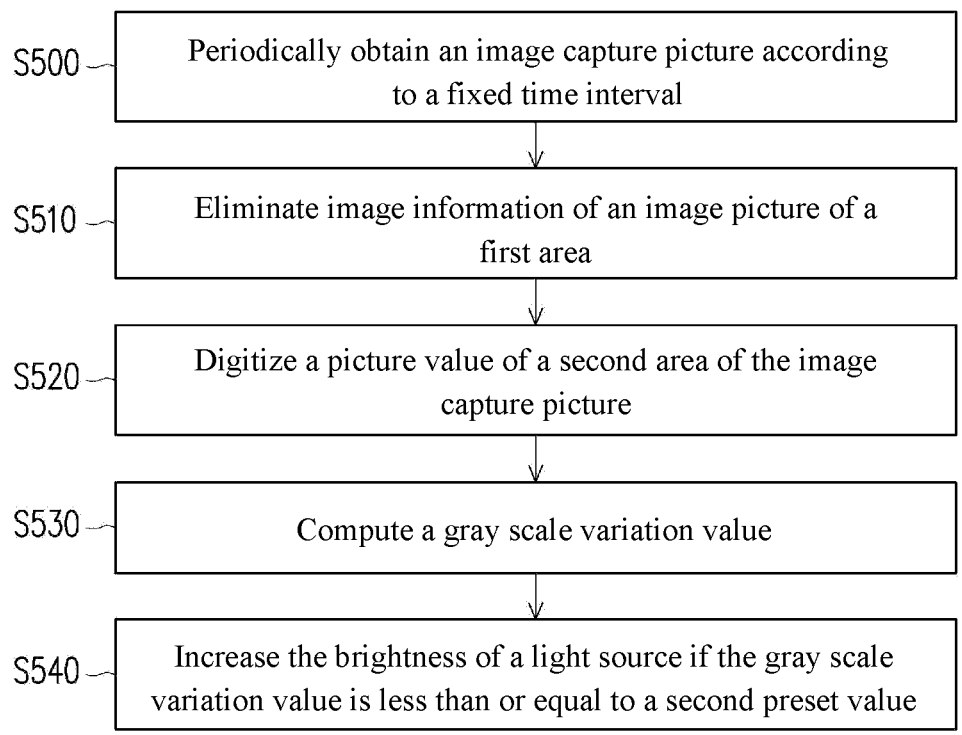
FIG. 9C illustrates a step flowchart of a brightness adjusting method of the embodiment in FIG. 9A.

FIG. 9A illustrates a schematic outline diagram of a projection device of an embodiment of the disclosure in a fourth application scenario. FIG. 9B illustrates a schematic outline diagram of an image capture picture of the embodiment of FIG. 9A. FIG. 9C illustrates a step flow diagram of a brightness adjusting method of the embodiment of FIG. 9A. Referring to FIG. 9A to FIG. 9C, the projection device 100 of the embodiment, for example, is used in an application scenario with obvious change of the brightness of the ambient light source 300. For example, all lamps in a meeting room are turned on from the state of being turned off.

The brightness adjusting method of the embodiment is similar to the brightness adjusting method of FIG. 6C, and a main difference between the two, for example, lies in that the gray-scale values of second areas 220 of the image capture pictures CI_(N−1) and CI_(N) of the embodiment are, for example, respectively 120 and 200. In step S540, the control unit determines a numerical value relationship between a gray scale variation value and a preset value. In the embodiment, the gray scale variation value is −80; and when the gray scale variation value is less than or equal to the second preset value (for example herein, −50), the control unit 130 increases the brightness of the light source 112. That is, in the fourth application scenario, the control unit 130 determines that the ambient brightness becomes bright from dark, and therefore increases the brightness of the light source 112, so as to avoid discomfort of the eyes of the user.

Figure 10:
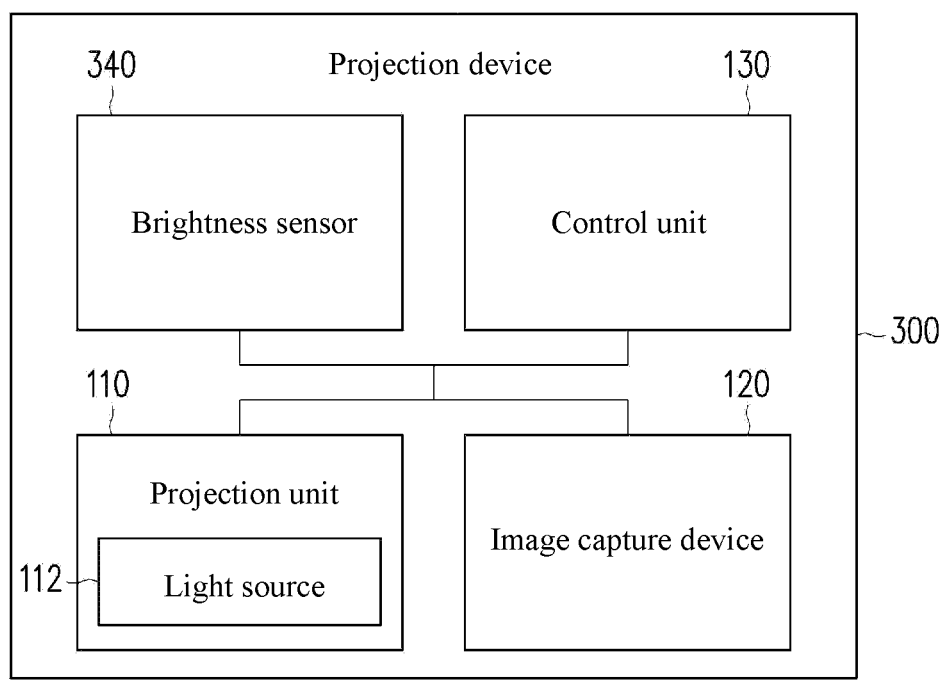
FIG. 10 illustrates a schematic outline diagram of a projection device of another embodiment of the disclosure.

FIG. 10 illustrates a schematic outline diagram of a projection device of another embodiment of the disclosure. Referring to FIG. 1 and FIG. 10, the projection device 300 of the embodiment is similar to the projection device 100 of the embodiment of FIG. 1, and a main difference between the two, for example, lies in that the projection device 300 further includes a brightness sensor 340. The brightness sensor 340 is coupled to the control unit 130. In the embodiment of FIG. 6A, the image capture device 120 periodically obtains the image capture pictures CI_(N−1) and CI_(N) according to a fixed time interval, but the disclosure is not limited thereto. In the embodiment of FIG. 10, the control unit 130 determines, according to a sensed ambient brightness variation value, whether to control the image capture device 120 to obtain an image capture picture CI including an image picture PI. The brightness sensor 340, for example, may be disposed on the projection device 300. Even if the ambient brightness value sensed by the brightness sensor 340 is different from an ambient brightness value of a position where a user is located, an effect of determining whether the ambient brightness is changed may be still achieved. Further, the image capture device 120 may first obtain an initial image capture picture as the image capture picture CI_(N−1) after the projection device 300 is turned on. Then the brightness sensor 340 outputs a sensing result to the control unit 130. When the control unit 130 determines that the ambient brightness variation value sensed by the brightness sensor 340 is not in a preset range according to the received sensing result, it is indicated that the ambient brightness is changed, the control unit 130 then controls the image capture device 120 to obtain the image capture picture CI including the image picture PI, as the image capture picture CI_(N). In this case, the projection device 300 of the embodiment still determines, according to a picture variation value of the image capture picture CI obtained by the image capture device, whether to adjust the brightness of the light source 112, but the image capture device 120 does not need to continuously and periodically obtain the image capture pictures.

In conclusion, the embodiments of the disclosure at least include one of the following advantages or effects. The projection device obtains the image capture picture through the image capture device to determine the environmental change. Even if performing the projection operation, the projection device may still automatically determine the ambient brightness variation, so as to adjust the brightness of the light source. Further, by taking the brightness surrounding the image picture as a reference, the brightness of the light source of the projection device may be properly adjusted according to environmental factors, so as to avoid discomfort of the eyes of the user due to excessively high brightness of the light source.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, comprising a projection unit, an image capture device and a control unit, wherein
    the projection unit is configured to project an image picture to a projection area, the projection unit comprises a light source;
    the image capture device is configured to obtain an image capture picture comprising the image picture in an image capture range, the image capture range is greater than the projection area; and
    the control unit is coupled to the image capture device and configured to determine, according to a picture variation value of the image capture picture, whether to adjust brightness of the light source, wherein the image capture picture comprises a first area and a second area, the first area corresponds to the projection area, the second area corresponds to a non-projection area, and the control unit determines, according to the picture variation value of the second area, whether to adjust the brightness of the light source.

2. The projection device according to claim 1, wherein when the picture variation value of the second area is greater than or equal to a first preset value, the control unit reduces the brightness of the light source; and when the picture variation value of the second area is less than or equal to a second preset value, the control unit increases the brightness of the light source, the first preset value is greater than the second preset value.

3. The projection device according to claim 1, wherein the picture variation value of the second area comprises information of ambient brightness variation.

4. The projection device according to claim 1, wherein the picture variation value is a brightness variation value, a gray scale variation value or a color variation value.

5. The projection device according to claim 1, wherein the image capture device periodically obtains the image capture picture comprising the image picture according to a fixed time interval.

6. The projection device according to claim 5, wherein the control unit determines a numerical value relationship between the picture variation value and a preset range according to the image capture picture obtained by the image capture device at different times.

7. The projection device according to claim 1, wherein the control unit comprises:
    a determining unit, coupled to the image capture device, and configured to determine a numerical value relationship between the picture variation value and a preset value range according to the image capture picture and output a determining result; and
    a control feedback unit, coupled to the determining unit, and configured to receive the determining result, and determine, according to the determining result, whether to adjust the brightness of the light source.

8. The projection device according to claim 1, wherein the projection device further comprises a brightness sensor, the brightness sensor is coupled to the control unit, and the control unit determines, according to an ambient brightness variation value sensed by the brightness sensor, whether to control the image capture device to obtain the image capture picture comprising the image picture.

9. A brightness adjusting method, used for a projection device, the projection device comprising a light source, and the brightness adjusting method comprising:
    projecting an image picture to a projection area;
    acquiring an image capture picture comprising the image picture in an image capture range, wherein the image capture range is greater than the projection area; and
    determining, according to a picture variation value of the image capture picture, whether to adjust brightness of the light source,
    wherein the image capture picture comprises a first area and a second area, the first area corresponds to the projection area, and the second area corresponds to a non-projection area, wherein
    in the step of determining, according to the picture variation value of the image capture picture, whether to adjust the brightness of the light source, whether to adjust the brightness of the light source is determined according to the picture variation value of the second area.

10. The brightness adjusting method according to claim 9, wherein in the step of determining, according to the picture variation value of the image capture picture, whether to adjust the brightness of the light source,
    when the picture variation value of the second area is greater than or equal to a first preset value, the brightness of the light source is reduced; and
    when the picture variation value of the second area is less than or equal to a second preset value, the brightness of the light source is increased, the first preset value is greater than the second preset value.

11. The brightness adjusting method according to claim 9, wherein the picture variation value of the second area comprises information of ambient brightness variation.

12. The brightness adjusting method according to claim 9, wherein the picture variation value is a brightness variation value, a gray scale variation value or a color variation value.

13. The brightness adjusting method according to claim 9, wherein in the step of acquiring the image capture picture comprising the image picture in the image capture range, the image capture picture comprising the image picture is periodically obtained according to a fixed time interval.

14. The brightness adjusting method according to claim 13, wherein the step of determining, according to the picture variation value of the image capture picture, whether to adjust the brightness of the light source comprises:
    determining a numerical value relationship between the picture variation value and a preset range according to the image capture picture obtained at different times.

15. The brightness adjusting method according to claim 9, wherein the step of determining, according to the picture variation value of the image capture picture, whether to adjust the brightness of the light source comprises:

determining a numerical value relationship between the picture variation value and a preset range according to the image capture picture and outputting a determining result; and determining, according to the determining result, whether to adjust the brightness of the light source.

16. The brightness adjusting method according to claim 9, wherein in the step of acquiring the image capture picture comprising the image picture in the image capture range, whether to obtain the image capture picture comprising the image picture is determined according to an ambient brightness variation value.

\* \* \* \* \*